Sept. 28, 1954
C. M. SHAPIRO
2,690,350
COMBINED WEATHER STRIP, ARMREST, WINDOW WIPER, AND
ANTIRATTLE DEVICE FOR AUTOMOBILE DOOR WINDOWS
Filed July 8, 1950
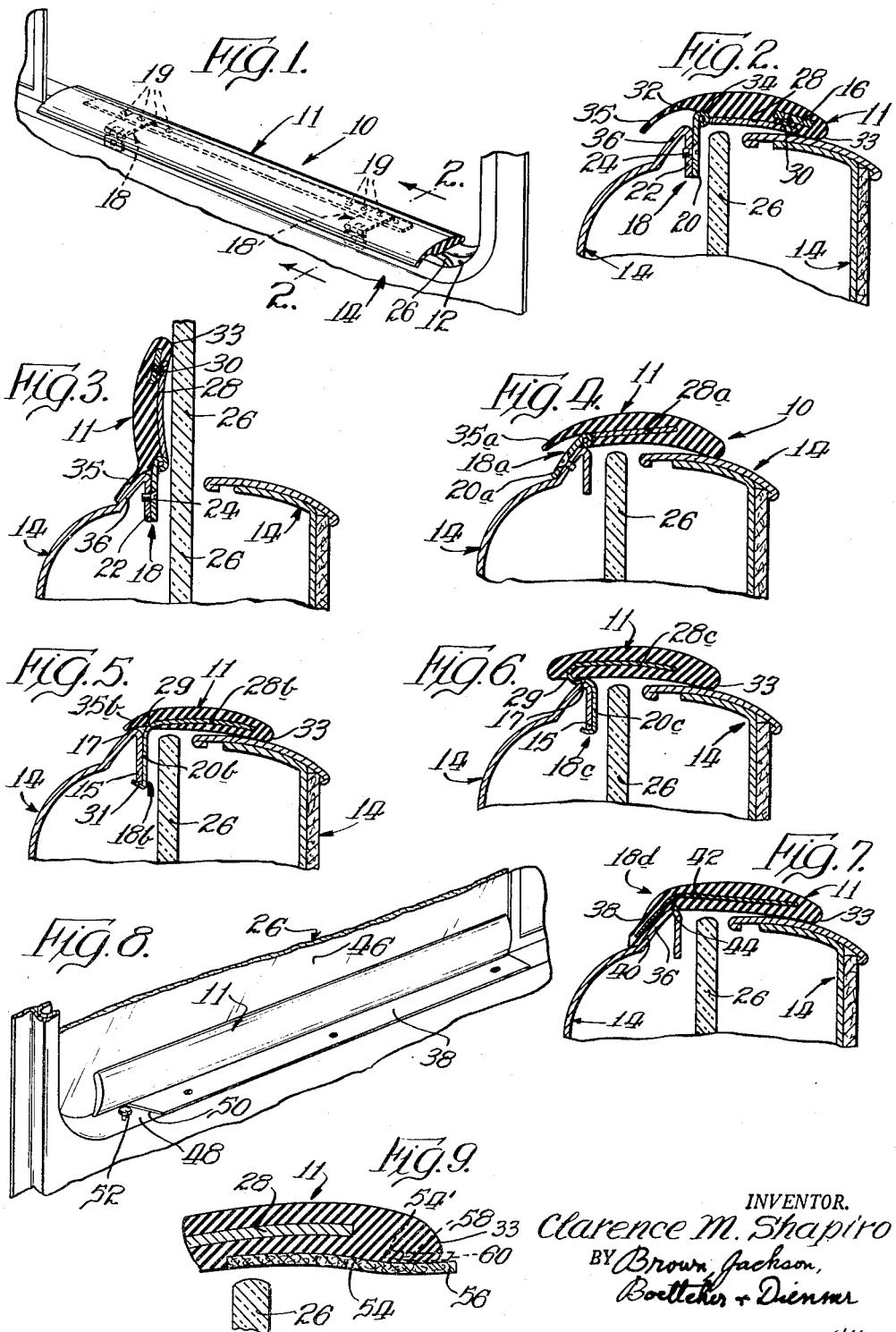
INVENTOR.
Clarence M. Shapiro
BY Brown, Jackson,
Boettcher + Dienner
Attys.

Patented Sept. 28, 1954

2,690,350

UNITED STATES PATENT OFFICE 2,690,350

COMBINED WEATHER STRIP, ARMREST, WINDOW WIPER, AND ANTIRATTLE DEVICE FOR AUTOMOBILE DOOR WINDOWS

Clarence M. Shapiro, Chicago, Ill.

Application July 8, 1950, Serial No. 172,740

11 Claims. (Cl. 296—49.2)

This invention pertains to a new and useful article of manufacture in the form of a special type of weather stripping for use in conjunction with windows of an automobile door.

Most automobile and truck doors have window glass which may be raised and lowered through a slot disposed on the lower part of the window frame portion of the door, the window glass, when completely lowered, lying inside of the door and generally having its top edge lying below, or flush with, the slot and, when completely raised, generally having its side edges and top edge disposed within a groove which extends up the side and top parts of the window frame portion. Even when the window glass is held by its lower edge in a supporting structure, which will, when the window glass is completely raised, partially fill the slot to close it off to water, snow, dirt, etc., some water and dirt can get inside the door. This is especially true when the automobile is being washed. However, when the window is lowered, either partially or completely, then rain, snow, dirt and the like can get inside of the door between the glass and frame very easily, with the result that the door may rust from the inside and the operating mechanism for the window glass and door latch may rust or become damaged by water and dirt working into it. Most doors have drain holes provided at the bottom edge to discharge such water.

By my invention, damage to the door and to the mechanism inside of it may be prevented. I provide a weatherstrip member which may be disposed either interiorly of the passenger compartment or exteriorly. Preferably, I dispose the weather strip member so that it bears against the outer surface of the window glass, and across the space between the glass and adjacent door structure, such as the window frame portion, when the glass is raised partially or completely. The weather strip member is a generally longitudinally extending member which is adapted to extend the width of the window glass and it is wider than the slot in the door through which the glass is raised and lowered. When the window glass is completely lowered, the strip seats across the slot and prevents the entry of water, snow, dirt, etc., into the slot. When the window is thereafter raised, the weather strip member pivots on its hinge-like fastening means, the latter being connected with the adjacent door structure, and one edge of the strip continues to bear against the outer side of the window glass. Consequently, the weather strip member is effective at all times, regardless of the height of the glass.

As a further advantage to my invention, I form the weather strip member as a resilient cushion on which the driver or passenger may rest his arm. Not only is the cushioning effect very desirable, but the material which may be employed is a poor conductor of heat so that the window frame portion of the door will neither burn nor chill the arm of the person who rests his elbow or arm on it.

Furthermore, since the article of my invention resiliently engages the window glass and acts between it and the adjacent door structure, it acts as an "anti-rattle" device to prevent the window glass from rattling in its frame.

Also, when there is rain or snow on the window glass and the glass is lowered, the edge of the weather strip acts as a scraper, or squeegee, to clear the glass.

While various means for fastening the weather strip, cushion member to the adjacent door structure may be employed, I prefer a hinge-like connection which resiliently urges the member toward the window glass and over the slot with the fastening means being concealed from view.

It is a further advantage of my invention that it may be readily marketed as an attachment to be easily added by the car owner or an automobile mechanic or may be part of the standard equipment of new automobiles.

Further objects, uses and advantages of my invention will become apparent or be obvious from the following description, when taken with the drawings, in which:

Figure 1 is a perspective view of one form of the invention, partially broken away, and of associated door structure, with the window glass being shown in lowered position;

Figure 2 is a sectional view on the line 2—2 of Figure 1;

Figure 3 is a sectional view similar to that of Figure 2, showing the window glass raised;

Figure 4 is a modification of the structure of Figure 1, in cross section, showing a connection with the outer surface of an automobile door;

Figure 5 is a cross sectional view of another modification of the invention shown in Figure 1;

Figure 6 is a modification, in cross section, of the device of Figure 5;

Figure 7 is another modified form of my invention shown in cross section;

Figure 8 is a perspective view of a modification of the invention of Figure 7 showing the invention mounted on the inside of an automobile door window; and Figure 9 is an enlarged fragmentary view, in cross section, showing a modification of that edge of the structure of my invention which engages the surface of the window glass.

Referring first to Figures 1, 2 and 3, there will be seen the device 10 which comprises my invention, the weather strip member thereof being indicated generally by the reference numeral 11. The member 11 is longitudinally extending and has a length corresponding to the length of the window slot 12 in the automobile door structure 14 and has a width greater than the slot 12. The right-hand end of the member 11, as viewed in Figure 1, has been broken away to show the slot 12 and window glass 26. The weather strip member is waterproof and preferably of a resilient construction and of a thickness such as that shown whereby it may also serve as a cushion on which the arm of a driver or a passenger may be rested conveniently. As such an arm rest or cushion, it also serves to prevent a bare arm of a driver or passenger from engaging either a too hot or too cold surface of the door structure. The weather strip-cushion member 11 may have a longitudinally extending reenforcing, or supporting, strip, such as the metal strip 16 which parallels the edge of the weather strip-cushion member 11 but is shorter than the member 11. By having the reenforcing member 16 shorter, it is possible to trim off the ends of the weather strip-cushion member to accommodate different lengths of slots. The member 16 may have a plurality of tapped holes 19 into which screws may be threaded for securing the fastening means, indicated generally by the reference numeral 18, to said reenforcing and supporting member 16. The plurality of holes at spaced positions permits the user to shift the fastening means 18 to different positions for different door structures.

The fastening means 18 consists of a metal spring hinge, one arm 20 of which may be associated with adjacent automobile door structure, as shown at 22, by use of a screw 24, or by welding or other means. The spring (not shown) of the hinge is of a conventional type. With the arm 20 disposed between the window glass 26 and the adjacent door structure 14, the arm 20 is well concealed from view. The other arm 28 of each hinged fastening means 18 is preferably bonded to the under surface of the weather strip-cushion member 11 and is secured as by a screw 30 to the reenforcing member 16. The reenforcing member 16 will, therefore, be seen to serve as a means for securing the fastening means 18 to the cushion member and also to reenforce that edge of the weather strip-cushion member 11 which is engaged with the window glass 26 when the window glass is raised and lowered.

As may be best seen from Figures 2 and 3, the arm 28 and the arm 20, where they join at the hinge pin 32, are disposed in a recess, indicated generally by the reference numeral 34, in the under side of the member 11 in order that the arm itself not bear against the adjacent door structure. Where the reenforcing member 16 is imbedded in the weather strip-cushion member 11, as shown, holes are formed in the under surface of the member 11 in alignment with the holes 19 in the reenforcing member 16 so that there is no difficulty in inserting and threading the screws 30 into the holes 19.

The left end of the weather strip-cushion member 11 (as viewed in Figures 2 and 3) overhangs the hinged fastening member and one edge of the slot 12, while the right-hand end of the member 11 overhangs the remainder of the slot 12. The left-hand end may be made thinner, and hence more flexible, in order to permit it to accommodate itself to the various configurations which different automobile doors have on their exterior, as shown at 36, and to permit easier flexing when the window glass 26 is raised.

With the weather strip device of my invention positioned as shown in Figures 1 and 2, it will be seen that even when a window glass is lowered to its lowermost position, when there is rain or snow, the slot 12 will not have water or snow, dirt, etc., enter it. When the window glass 26 is raised either partially or to its completely closed position, the weather strip device of my invention will assume the position shown in Figure 3 and its edge 33 will tightly press against the glass to prevent the entry of water between the glass and the adjacent automobile door structure 14 even though water may be directed directly against the glass, by a hose or the like, when the automobile is being washed. The other edge or margin 35 will be tightly pressed against the associated automobile door structure 14, as at 36, and its natural resiliency will further the action of the spring (not shown) which is embodied in the hinged fastening means 18 in urging the weather strip-cushion member 11 against the surface of the window glass.

As will be readily seen, particularly from Figure 3, the action of the spring hinge will cause the weather strip-cushion member 11 to bear against the window glass when said glass is raised out of the slot 12 and it will, therefore, serve also to hold the glass against rattling in its frame. It will also be readily apparent that as the window is lowered from its fully closed position, or some intermediate position, downwardly, into the slot 12, the edge 33 which bears against the glass will act as a squeegee to clear off water, snow, dirt, etc., which are on the outer surface of the glass.

In Figure 4 there is shown a modification of the fastening means wherein the arm 28a of the hinged fastening means 18a is molded into the rubber-like weather strip-cushion member 11 and wherein the other arm 20a is secured to the outer surface of the adjacent door structure beneath the overhanging end 35a of the weather strip member 11, as by screws, welding, etc. The hinged fastening means 18a preferably incorporates a spring which urges the weather strip-cushion member 11 to the position wherein it covers the slot 12.

In Figure 5 there is shown a modified form of my invention in which the fastening means 18b provides a hinge-like structure similar in its general dimensions to the spring hinge 18 of Figures 1 through 3, but differing in that there is no actual hinge pin, the two arms 20b and 28b being joined by a resilient curved portion 29. The arm 28b is molded into the weather strip-cushion member 11, while the arm 20b has a hooked end 31 which is adapted to engage under the adjacent automobile door structure 14 as at 15. The overhanging (left-hand) end 35b of the weather strip-cushion member is adapted to bear against the adjacent automobile door structure as at 17 so that the whole device may be frictionally held in place by a resilient gripping action. If desired, the arm 20b of the fastening means 18b could also be secured as by welding or screws in the manner indicated above with respect to the device shown in Figures 1, 2 and 3.

The device shown in Figure 6 is a modification of that illustrated in Figure 5, the fastening means 18c at its curved portion 29, which joins the arms 20c and 28c, being reversely curved in joining the arms. This permits a spring clamp between the points 15 and 17 on the adjacent automobile door structure 14.

In Figure 7 there is shown another modification of the invention wherein the fastening means 18d comprises a longitudinally extending rubber-like waterproof strip or flange 38 having an adhesive surface 40 which is adapted to be struck or bonded to the surface 36 of the adjacent automobile door structure 14 on the outer side of the door. Preferably, the flange 38 is formed integrally with the weather strip-cushion member 11 and is of the same material. There may be molded into the flange 38, which comprises the fastening means 18d, and into the weather strip-cushion member 11 a resilient metal element 42 preformed to urge the weather strip-cushion member 11 into the position shown in Figure 7. This element 42 may either be a continuous strip running longitudinally through the flange 38 and the weather strip-cushion member 11 or may comprise one or more elements of the general dimensions shown for the hinge 18 of Figures 1, 2 and 3.

To assist in providing a hinge-like connection between the flange 38 and the weather strip-cushion member 11, there is formed a recess 44 on the under surface between the flange 38 and said member 11, which recess extends longitudinally from one end of the device 10 to the other.

Figure 8 illustrates the manner in which the device of Figure 7 might be applied on the inside of the automobile door in order to have the weather strip-cushion member 11 bearing against the inner surface 46 of the window glass 26. If preferred, the flange 38 may be secured by screws or other fastening elements to the window ledge 48 or it may be bonded, as was described with respect to Figure 7. It will be observed that there is a cut-out corner 50 of the flange 38 in order to avoid the button 52 which controls the locking of the automobile door latch.

In Figure 9 there is shown an enlarged fragmentary view in which the under surface of the weather strip-cushion member 11 is provided with a longitudinally extending strip of material 54 which has a lesser coefficient of friction with respect to the window glass 26 than does the weather strip-cushion member 11 itself. The right-hand edge (as viewed in Figure 9) of the strip 54 may extend outwardly slightly beyond the right-hand edge 33 of the weather strip-cushion member 11 so that the strip 54 will bear against the window glass and make it easy to raise or lower the glass past the device. Alternatively, the strip 54 may be disposed as at 54' in a longitudinally extending slot 58 and have a bevelled edge 60 protruding from the slot, all as indicated in dotted lines in Figure 9. The strip 54 may extend to the left (as viewed in Figure 9), on the under surface of member 10, sufficiently far that it is engaged by the top edge of the window glass 26 even when the glass is first raised from the slot.

The strip 54 may be formed of a variety of materials such as compressed felt or jute which has been rendered waterproof or it might be formed as a layer of cloth or cork molded into the surface of the weather strip-cushion member 11.

It will be appreciated that the strip 54 of the weather strip-cushion member 11 is also applicable to the modifications shown in Figures 1 through 8 and that the various modifications also may be fastened to the inner side of the door structure, that is, on the passenger compartment side, if desired.

While I have illustrated preferred embodiments of the invention, I do not intend to be limited thereto, except insofar as the appended claims are so limited, since various modifications and changes coming within the scope of my invention will be suggested to others by this disclosure.

I claim:

1. A new article of manufacture for use in conjunction with an automobile door window comprising a waterproof cushion member of a length adapted to correspond to the length of the window slot in the automobile door and of a width greater than said slot, fastening means for connecting the cushion member with the automobile door, said cushion member being secured to said fastening means for hinge-like movement from a raised position, wherein it bears against the window glass when the latter is raised, to a position over said slot when the window glass is lowered through said slot, the cushion member in the latter position serving as an arm rest and weather strip, and a longitudinally extending reenforcing element in the cushion member paralleling that edge of the member which bears against the window glass, said fastening means being connected to said reenforcing element to secure said cushion member to said fastening means.

2. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member being secured to said fastening means for hinge-like movement from a raised position, wherein it bears against the window when the latter is raised, to a position over said slot when the window is lowered through said slot, the cushion member in the latter position serving both as an arm rest and weather strip, the underside of said cushion member having a recess with that end of the fastening means which is connected to the cushion member and with the hinge-like portion being disposed in said recess.

3. A new article of manufacture for use in conjunction with an automobile door window comprising a weather strip cushion member of a length adapted to correspond to the length of the window slot in the automobile door and of a width greater than said slot, fastening means in the form of a two arm spring hinge structure for connecting the cushion member with the automobile door, said cushion member having a longitudinal slot therein communicating with the lower side thereof, and a longitudinally extending reinforcing element in said slot, one arm of said spring hinge structure being adapted to be connected with the adjacent automobile door structure and the other arm being connected with said reinforcing element.

4. A new article of manufacture for use in conjunction with an automobile door window comprising a weather strip member of a length adapted to correspond to the length of the window slot in the automobile door and of a width greater than said slot, and fastening means in the form of a spring hinge structure having two arms, one arm of said spring hinge structure being adapted to be connected with the adjacent automobile door structure and the other arm being connected with said weather strip member, said spring hinge structure extending substantially the full length of said weather strip member and being disposed within the marginal confines of and beneath the same.

5. A new article of manufacture for use in conjunction with an automobile door window comprising a waterproof weather strip member of a length adapted to correspond to the length of the window slot in the automobile door and of a width greater than said slot, and fastening means for connecting the weather strip member with the automobile door structure, said weather strip member being secured to said fastening means for hinge-like movement from a raised position, wherein it bears against the window glass when the latter is raised, to a position over said slot when the window glass is lowered through said slot, the hinge-like connection lying inwardly of the margins of said waterproof weather strip member and beneath said member.

6. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member being secured to said fastening means for hinge-like movement from a raised position, wherein it bears against the window glass when the latter is raised, to a position over said slot when the window glass is lowered through said slot, the cushion member in the latter position serving both as an arm rest and weather strip, said fastening means comprising a longitudinally extending rubber-like strip having an adhesive surface adapted to be connected with the adjacent automobile door structure.

7. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member being secured to said fastening means for hinge-like movement from a raised position, wherein it bears against the window glass when the latter is raised, to a position over said slot when the window glass is lowered through said slot, the cushion member in the latter position serving both as an arm rest and weather strip, said fastening means comprising a longitudinally extending rubber-like strip having an adhesive surface adapted to be connected with the adjacent automobile door structure and a resilient spring member of oblong cross-section extending between said cushion member and said rubber-like strip resiliently to urge said cushion member toward its position over the window slot.

8. A new article of manufacture for use in conjunction with an automobile door window comprising a waterproof cushion member of the length adapted to correspond to the length of the window slot in the automobile door and of a width greater than said slot, fastening means for connecting the cushion member with the automobile door, said cushion member being secured to said fastening means for hinge-like movement from a raised position, wherein it bears against the window glass when the latter is raised, to a position over said slot when the window glass is lowered through said slot, the cushion member in the latter position serving as an arm rest and weather strip, and a longituidnally extending reenforcing element in the cushion member paralleling that edge of the member which bears against the window glass, said fastening means comprising a substantially rigid member having a hinged connection with the cushion member, the hinged connection lying inwardly of the ends of the cushion member and inwardly of the longitudinally extending margin whereby the cushion member overhangs the hinged connection.

9. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member overlying said fastening means and being secured to said fastening means for hinge-like movement from a raised position, wherein it bears against the window glass when the latter is raised, to a position over said slot when the window glass is lowered through said slot, the cushion member in the latter position serving both as an arm rest and weather strip and in both positions providing a sealing closure for said slot, said fastening means including a pair of arms each having a spring-hinge connection with the cushion member, said cushion member providing a waterproof covering for said arms and said connection.

10. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member overlying said fastening means and being secured to said fastening means for hinge-like movement from a raised position, wherein it bears against the window glass when the latter is raised, to a position over said slot when the window glass is lowered through said slot, the cushion member in the latter position serving both as an arm rest and weather strip and in both positions providing a sealing closure for said slot, said fastening means including a longitudinally extending waterproof flange integral with the waterproof cushion member, said flange being adapted to overlie the automobile door structure and provide a seal with respect thereto.

11. A new article of manufacture for use in conjunction with an automobile door window comprising a waterproof cushion member of a length adapted to correspond to the length of the window slot in the automobile door and of a width greater than said slot, and fastening means for connecting the cushion member with the automobile door, said cushion member overlying said fastening means and being secured to said fastening means for hinge-like movement from a raised position, wherein it bears against the window glass when the latter is raised, to a position over said slot when the window glass is lowered through said slot, the cushion member in the latter position serving both as an arm rest and weather strip and in both positions providing a sealing closure for said slot, said fastening means comprising a resilient structure having one arm connected to the cushion member and another arm which, in cooperation with the surface of the cushion member, forms a spring clip adapted to resiliently connect with adjacent automobile door structure, said resilient structure being disposed within the marginal confines of said cushion member and beneath the same.

References Cited in the file of this patent

UNITED STATES PATENTS

| Number | Name | Date |
| --- | --- | --- |
| 991,140 | Davis | May 2, 1911 |
| 1,393,192 | Baker | Oct. 11, 1921 |
| 1,962,508 | Josselyn | June 12, 1934 |
| 2,070,760 | Straith | Feb. 16, 1937 |
| 2,206,334 | Rosner | July 2, 1940 |
| 2,274,026 | Allen | Feb. 24, 1942 |
| 2,563,252 | Larsen | Aug. 7, 1951 |

FOREIGN PATENTS

| Number | Country | Date |
| --- | --- | --- |
| 725,768 | France | Feb. 6, 1932 |